(12) United States Patent
Aldrete et al.

(10) Patent No.: US 12,280,642 B2
(45) Date of Patent: Apr. 22, 2025

(54) DUAL ANCHOR PIN AND CRACK INITIATOR SYSTEM FOR A VEHICLE DOOR

(71) Applicant: GM Global Technology Operations LLC, Detroit, MI (US)

(72) Inventors: Alan Denys Aldrete, Ecatepec de Morelos (MX); Javier Garfias, Sterling Heights, MI (US); Marco Antonio Gil, Toluca (MX)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 348 days.

(21) Appl. No.: 18/073,804

(22) Filed: Dec. 2, 2022

(65) Prior Publication Data

US 2024/0181852 A1    Jun. 6, 2024

(51) Int. Cl.
*B60J 5/04* (2006.01)
*B60R 13/02* (2006.01)

(52) U.S. Cl.
CPC ........... *B60J 5/0456* (2013.01); *B60J 5/0411* (2013.01); *B60J 5/0413* (2013.01); *B60J 5/0461* (2013.01); *B60J 5/0469* (2013.01); *B60R 13/0243* (2013.01)

(58) Field of Classification Search
CPC ...... B60J 5/0413; B60J 5/0468; B60J 5/0456; B60J 5/0411; B60J 5/0469; B60J 10/75; B60J 5/0412; B60J 5/042; B60R 13/0243

USPC ...... 296/146.5, 146.6, 146.7, 187.05; 49/502
See application file for complete search history.

(56) References Cited

U.S. PATENT DOCUMENTS

| | | | |
|---|---|---|---|
| 6,170,902 B1* | 1/2001 | Sakuma | B60J 5/0461 296/146.5 |
| 9,994,165 B1* | 6/2018 | Barrera Torres | B60R 13/0206 |
| 10,894,518 B2* | 1/2021 | Masuda | B60R 13/0243 |
| 2013/0205546 A1* | 8/2013 | Vemulapati | B60R 13/0243 24/289 |
| 2022/0332262 A1* | 10/2022 | Hamdoon | B60N 2/78 |

* cited by examiner

*Primary Examiner* — Amy R Weisberg
*Assistant Examiner* — Denise L. Esquivel
(74) *Attorney, Agent, or Firm* — CANTOR COLBURN LLP (57) ABSTRACT

A vehicle door includes an inner panel having an upper edge and a lower edge, a door trim panel having an upper edge portion and a lower edge portion, and an upper panel connected to the upper edge portion of the door trim panel. The upper panel includes an upper edge section and a lower edge section, and a crack initiator extending between the upper edge section and the lower edge section. A belt bracket connects the upper panel and the inner panel. The belt bracket includes a first dual pin member and a second dual pin member spaced from the first dual pin member. The first dual pin member and the second dual pin member connect the upper panel with the inner panel.

20 Claims, 9 Drawing Sheets

DUAL ANCHOR PIN AND CRACK INITIATOR SYSTEM FOR A VEHICLE DOOR

INTRODUCTION

The subject disclosure relates to the art of vehicle doors and, more particularly, to a dual anchor pin and crack initiator system for a vehicle door.

Vehicles include doors that are formed from multiple components and many different materials. Generally, a vehicle door will include a sheet metal outer panel, a sheet metal inner panel, and a door trim panel. The door trim panel is secured to the sheet metal inner panel by a plurality of fasteners. Under normal circumstances, the plurality of fasteners are more than adequate to retain the door trim panel to the sheet metal inner panel. However, during a side impact to the vehicle, forces may exceed a retention capability of one or more of the plurality of fasteners. Exceeding the retention capability of a fastener would lead to failure of one or more of the fasteners. One or more of the plurality of fasteners failing may lead to an unwanted separation between the door trim panel and the sheet metal inner panel as well the potential for the door trim panel, once separated, to interfere with side impact airbag deployment.

Traditionally, in order to prevent this unwanted separation of door components, more robust fasteners (i.e., fasteners having a greater retention force) were used to secure the door trim to the sheet metal inner panel. In some cases, in addition to the more robust fasteners, multiple reinforcing brackets were also employed to provide additional retention strength. The more robust fasteners and brackets increase door cost and complexity. Accordingly, it is desirable to provide a more cost effective and easy to manufacture system for securing a trim panel to a sheet metal door panel.

SUMMARY

A vehicle door, in accordance with a non-limiting example, includes an inner panel having an upper edge and a lower edge, a door trim panel having an upper edge portion and a lower edge portion, and an upper panel connected to the upper edge portion of the door trim panel. The upper panel includes an upper edge section and a lower edge section, and a crack initiator extending between the upper edge section and the lower edge section. A belt bracket connects the upper panel and the inner panel. The belt bracket includes a first dual pin member and a second dual pin member spaced from the first dual pin member. The first dual pin member and the second dual pin member connect the upper panel with the inner panel.

In addition to one or more of the features described herein the belt bracket includes an upper edge surface connected to the upper panel and a lower edge surface connected to the inner panel, the belt bracket including another crack initiator that extends between the upper edge surface and the lower edge surface.

In addition to one or more of the features described herein the crack initiator and the another crack initiator are substantially co-linear.

In addition to one or more of the features described herein the crack initiator and the another crack initiator are arranged between the first dual pin member and the second dual pin member.

In addition to one or more of the features described herein the crack initiator includes a depth of about 1.5 mm and a substantially V-shaped cross-section including a substantially 90° angle and the another crack initiator includes a depth of about 1 mm and another V-shaped cross-section including a substantially 90° angle.

In addition to one or more of the features described herein the vehicle door includes a 50th pole touch point spaced from a door in white (DIW) beltline end a first distance, the first dual pin member is arranged between about 20% and about 30% of the first distance from the 50th pole touch point.

In addition to one or more of the features described herein the crack initiator and the another crack initiator is arranged between about 30% and about 35% of the first distance from the 50th pole touch point.

In addition to one or more of the features described herein the second dual pin member is arranged between about 80% of the first distance from the 50th pole touch point.

In addition to one or more of the features described herein the crack initiator includes a substantially V-shaped cross-section having a first geometry and the another crack initiator includes another substantially V-shaped cross-section having a second geometry that is distinct from the first geometry.

In addition to one or more of the features described herein the inner panel includes an opening, the first dual pin member including a first component extending from the belt bracket through the opening and a second component extending from the upper panel through the first component.

A vehicle, in accordance with a non-limiting example, includes a body including a passenger compartment and at least one door. The at least one door includes an inner panel having an upper edge and a lower edge, a door trim panel having an upper edge portion and a lower edge portion, and an upper panel connected to the upper edge portion of the door trim panel. The upper panel includes an upper edge section and a lower edge section, and a crack initiator extending between the upper edge section and the lower edge section. A belt bracket connects the upper panel and the inner panel. The belt bracket includes a first dual pin member and a second dual pin member spaced from the first dual pin member. The first dual pin member and the second dual pin member connect the upper panel with the inner panel.

In addition to one or more of the features described herein the belt bracket includes an upper edge surface connected to the upper panel and a lower edge surface connected to the inner panel, the belt bracket including another crack initiator that extends between the upper edge surface and the lower edge surface.

In addition to one or more of the features described herein the crack initiator and the another crack initiator are substantially co-linear.

In addition to one or more of the features described herein the crack initiator and the another crack initiator are arranged between the first dual pin member and the second dual pin member.

In addition to one or more of the features described herein the crack initiator includes a depth of about 1.5 mm and a substantially V-shaped cross-section including a substantially 90° angle and the another crack initiator includes a depth of about 1 mm and another substantially V-shaped cross-section including a substantially 90° angle.

In addition to one or more of the features described herein the vehicle door includes a 50th pole touch point spaced from a door in white (DIW) beltline end a first distance, the first dual pin member is arranged between about 20% and about 30% of the first distance from the 50th pole touch point.

In addition to one or more of the features described herein the crack initiator and the another crack initiator is arranged between about 30% and about 35% of the first distance from the 50th pole touch point.

In addition to one or more of the features described herein the second dual pin member is arranged between about 80% of the first distance from the 50th pole touch point.

In addition to one or more of the features described herein the crack initiator includes a substantially V-shaped cross-section having a first geometry and the another crack initiator includes another substantially V-shaped cross-section having a second geometry that is distinct from the first geometry.

In addition to one or more of the features described herein the inner panel includes an opening, the first dual pin member including a first component extending from the belt bracket through the opening and a second component extending from the upper panel through the first component.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features.

Figure 1:
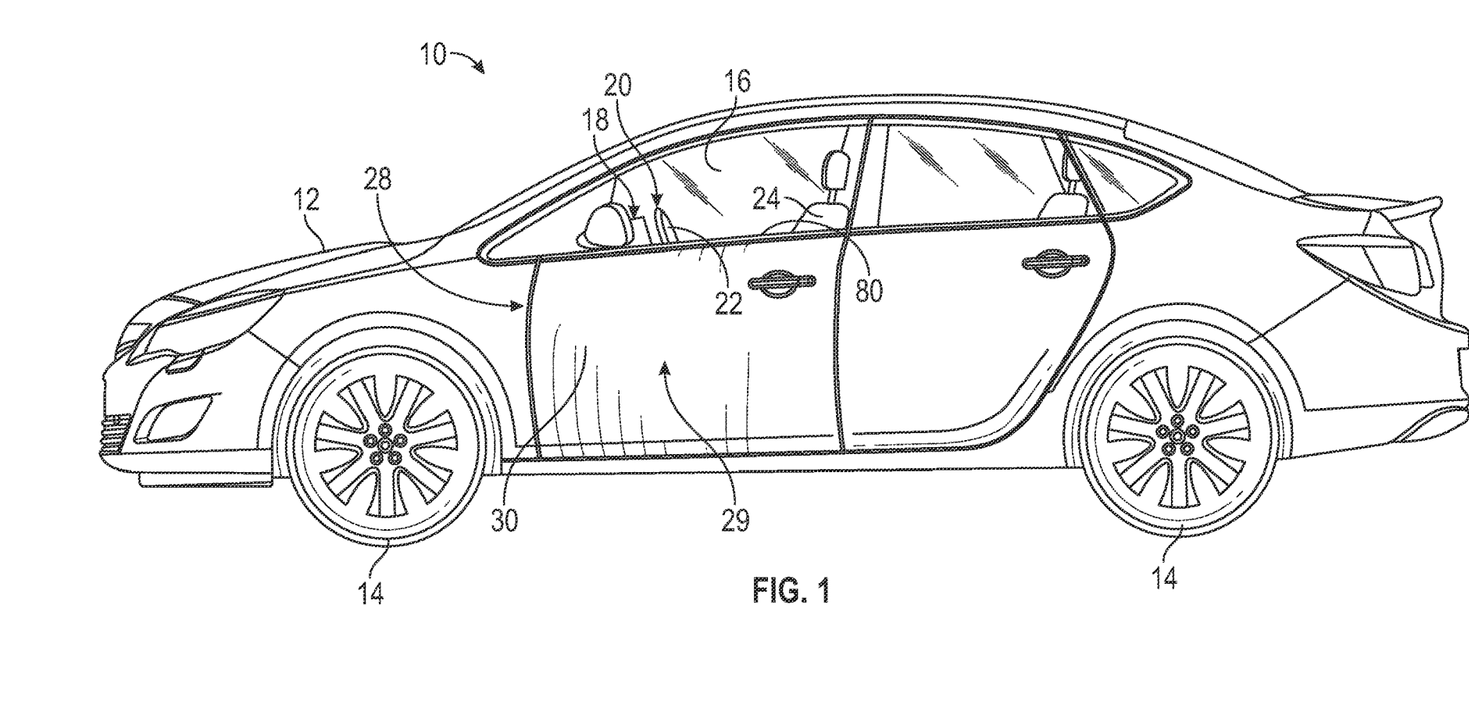
FIG. 1 is a left side view of a vehicle including a door having a dual anchor pin and crack initiator system, in accordance with a non-limiting example.

A vehicle, in accordance with a non-limiting example, is indicated generally at 10 in FIG. 1. Vehicle 10 includes a body 12 supported by a plurality of wheels, two of which are indicated at 14. In the non-limiting example shown, two of the plurality of wheels 14 are steerable. Body 12 defines a passenger compartment 16 within which is arranged a dashboard 18 and a steering system 20 including a steering wheel 22. Of course, it should be understood vehicle 10 may be an autonomous vehicle and thus may not include a steering wheel. A seat 24 is arranged aft of steering wheel 22. Body 12 includes a plurality of doors, one of which is indicated at 28, that provide access to passenger compartment 16.

Figure 2:
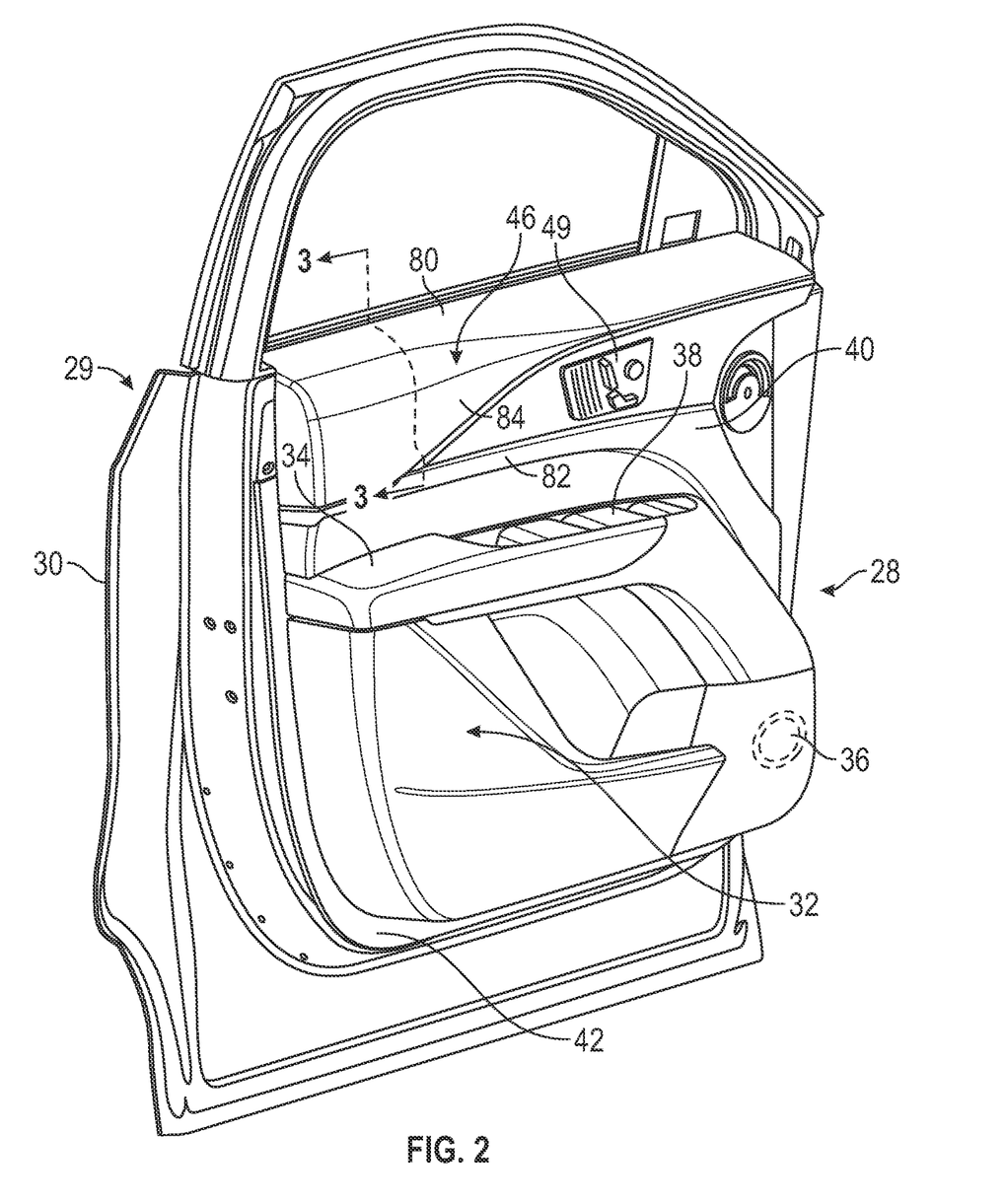
FIG. 2 is a right rear perspective view of the door of FIG. 1, in accordance with a non-limiting example.
Figure 3:
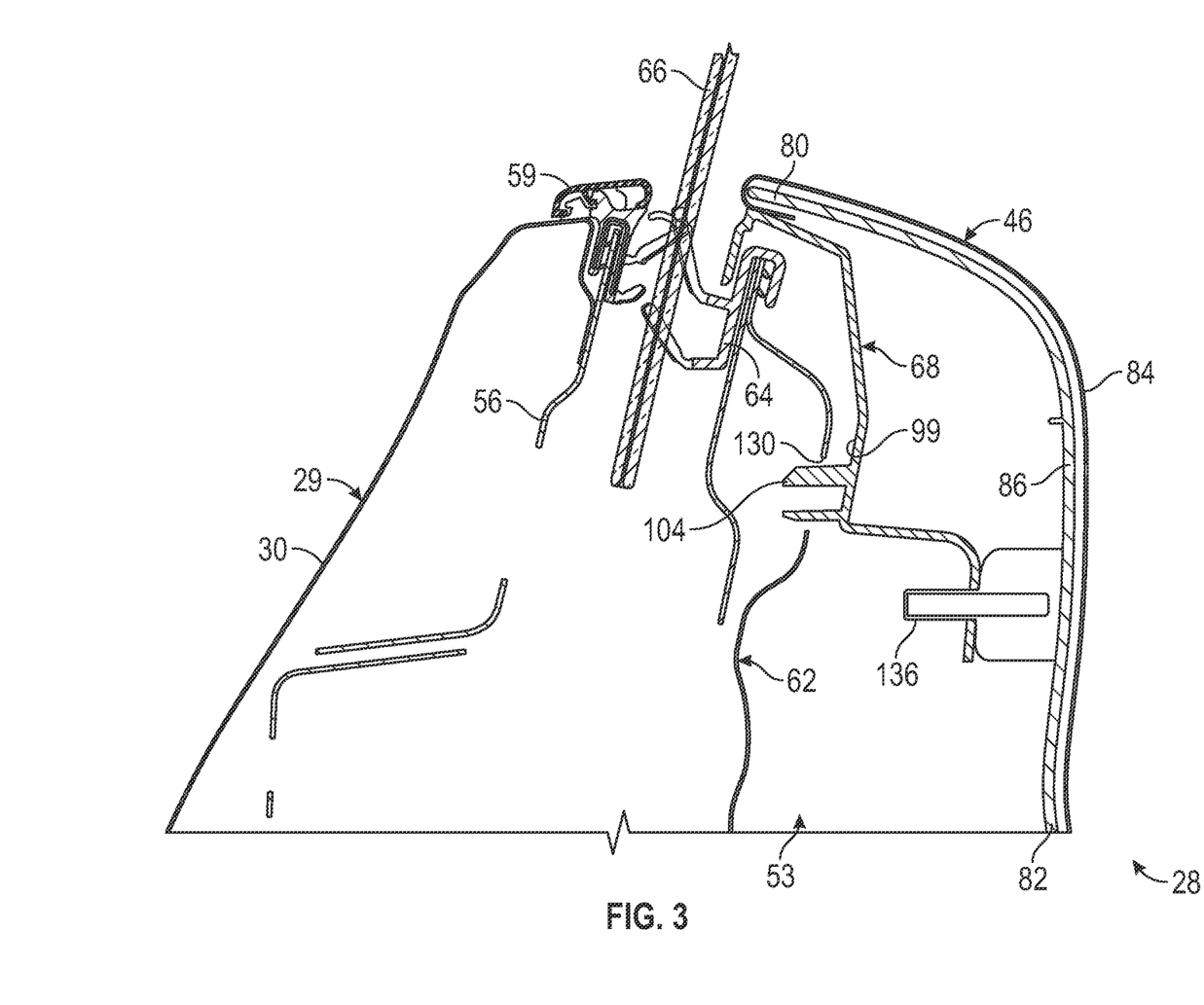
FIG. 3 is a cross-sectional view of a portion of the door of FIG. 2 taken through the line 3-3, in accordance with a non-limiting example.

Referring to FIGS. 2 and 3 and with continued reference to FIG. 1, door 28 includes external structure 29 including an outer panel 30 that may be formed by sheet metal. Outer panel 30 is typically coated with a paint having a color that is matched to vehicle 10. External structure 29 also includes a door trim panel 32 that includes an arm rest 34, supports speakers 36, and may include various controls 38 such as window controls, door lock controls, mirror adjustment controls and the like. Door trim panel 32 includes an upper edge portion 40 and a lower edge portion 42. At this point, it should be understood that external structure 29 is that structure that is visible without disassembling door 28. An upper panel 46 may be connected to door trim panel 32 and overlap upper edge portion 40. Upper panel 46 may include additional controls 49. Door trim panel 32 and upper panel 46 may be formed from various materials such as plastic, cloth, leather, carbon fiber and the like.

In a non-limiting example shown in FIG. 3, door 28 also includes internal structure or a door-in-white (DIW) 53. DIW 53 includes an outer inner panel 56 supporting an outer belt seal 59 and an inner, inner panel 62 supporting an inner belt seal 64. A window 66 is arranged between outer inner panel 56 and inner, inner panel 62 and engaged by outer belt seal 59 and inner belt seal 64. Outer belt seal 59 and inner belt seal 64 contact window 66 and substantially prevent dirt and water from entering into DIW 53. A belt bracket 68 is connected between inner, inner panel 62 and upper panel 46. Thus, belt bracket 68 serves as an interface between upper panel 46 and DIW 53.

Figure 4:
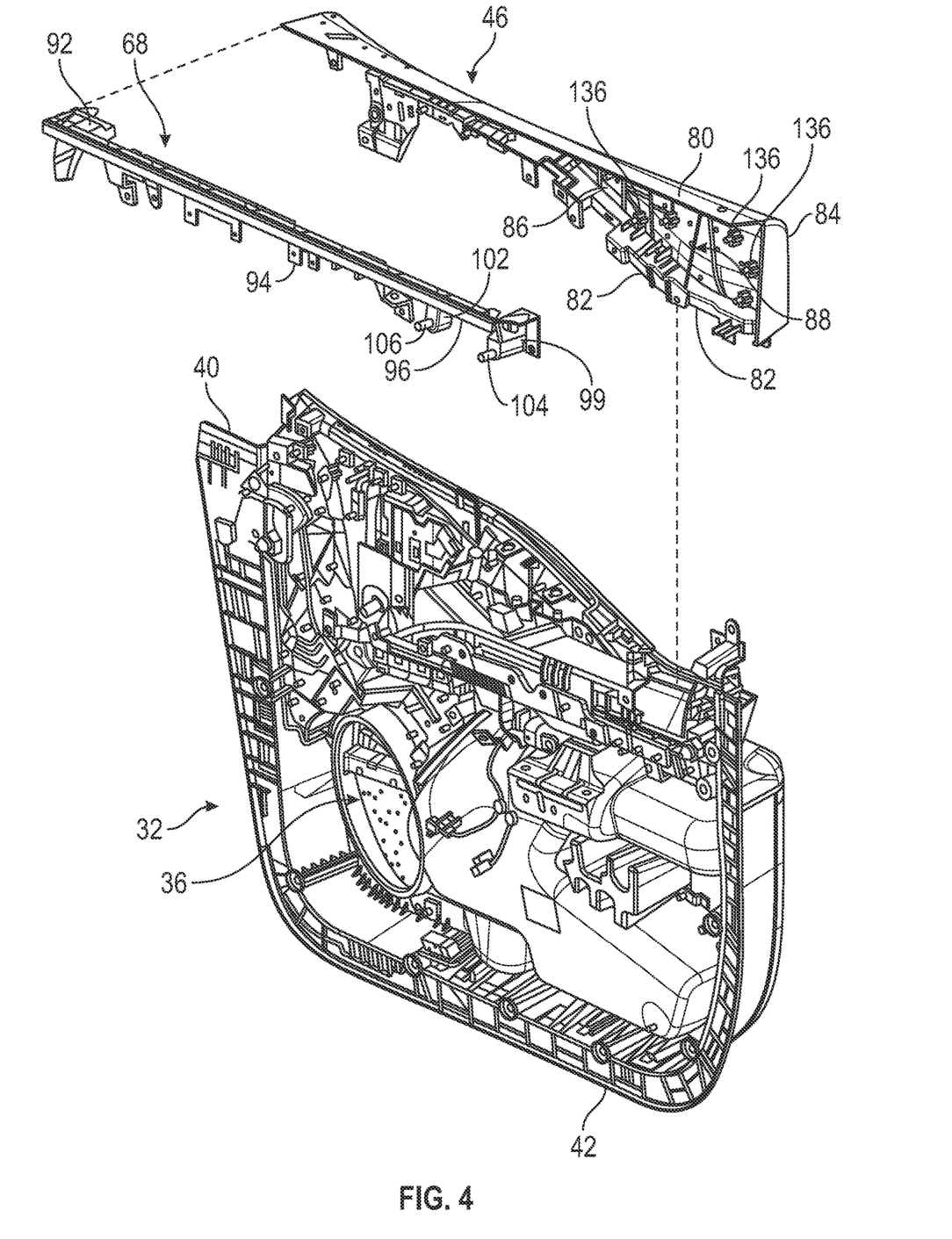
FIG. 4 is a disassembled view of a trim panel of the door of FIG. 2, in accordance with a non-limiting example.
Figure 5:
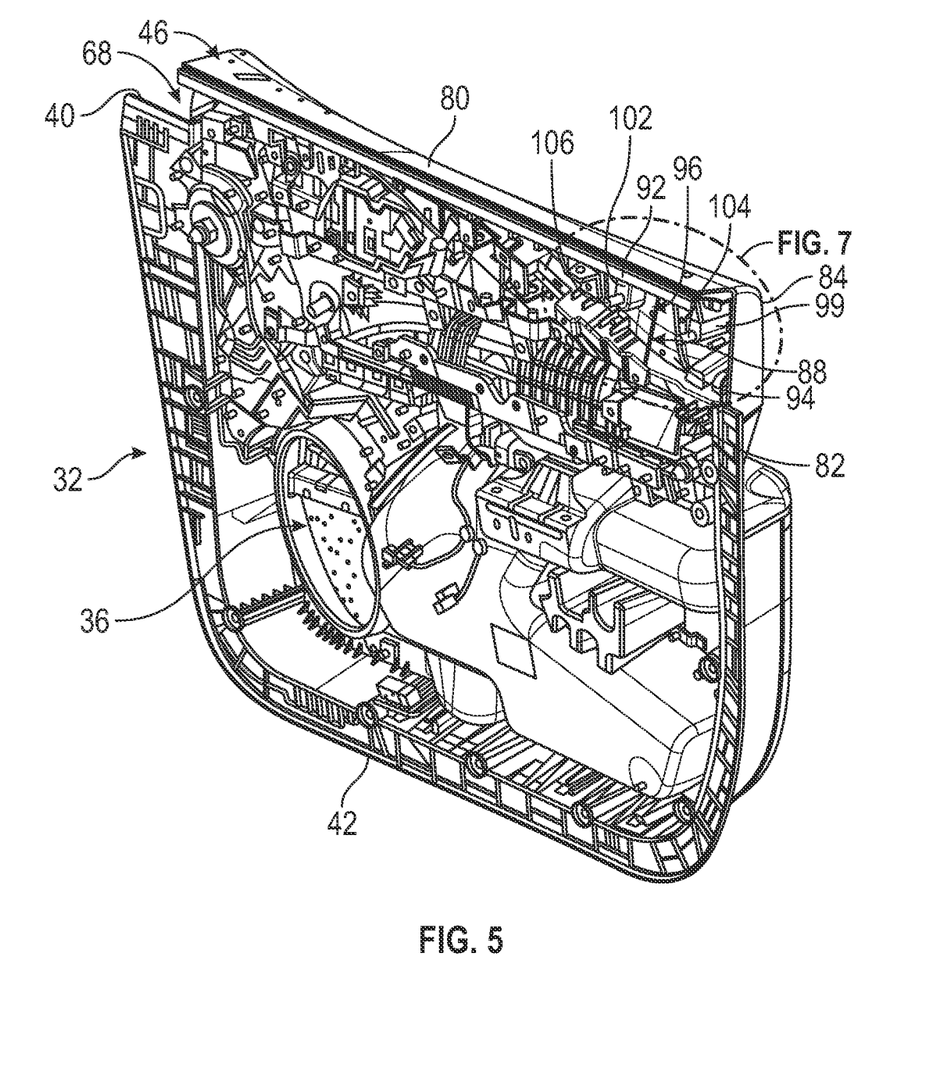
FIG. 5 is an assembled view of the door of FIG. 4, in accordance with a non-limiting example.
Figure 6:
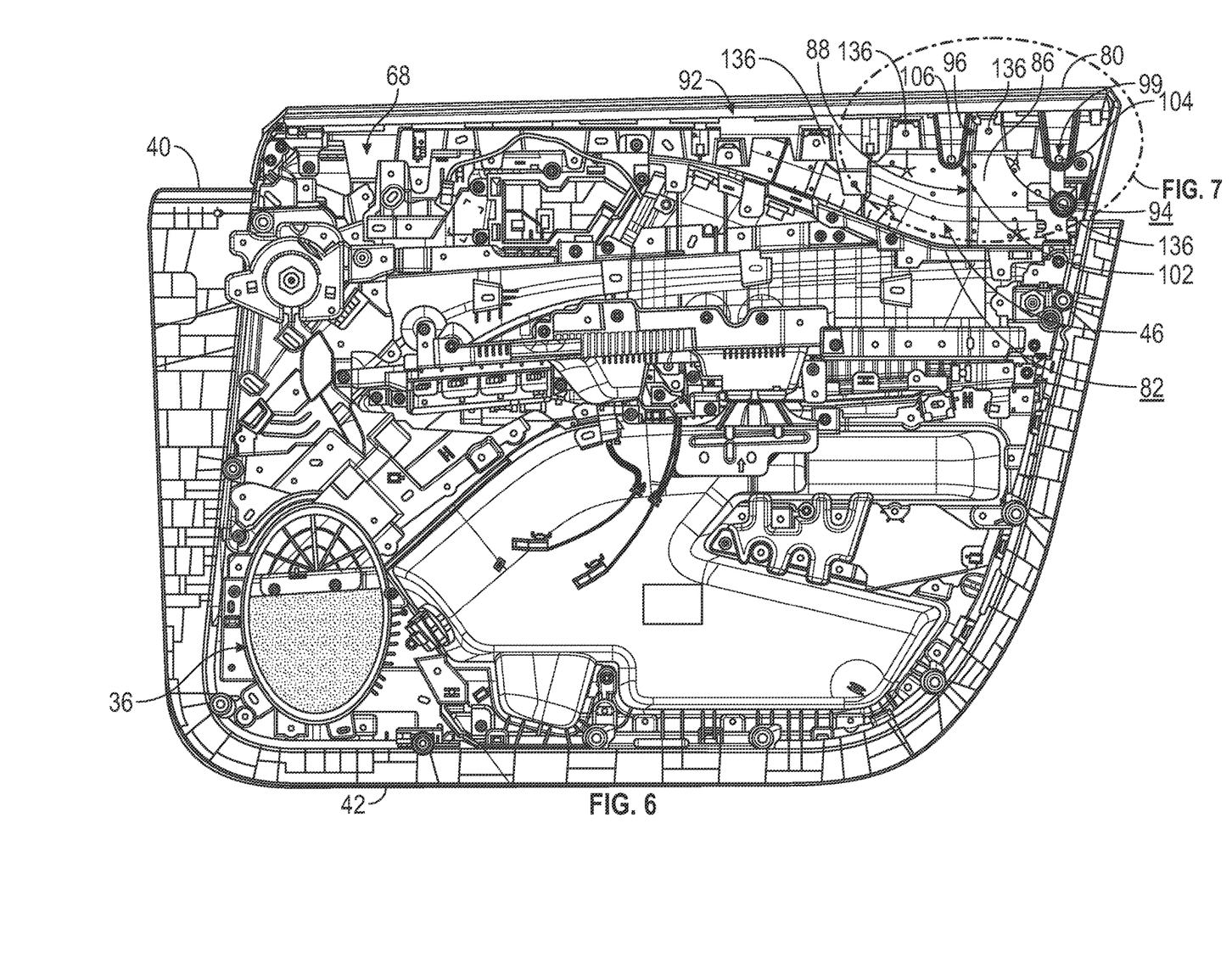
FIG. 6 is a plan view of the door of FIG. 5, in accordance with a non-limiting example.

Referring to FIGS. 4, 5, and 6 and with continued reference to FIG. 3, upper panel 46 includes an upper edge section 80, a lower edge section 82, an outer surface 84 and an inner surface 86. A first crack initiator 88 is formed in inner surface 86 of upper panel 46. First crack initiator 88 extends between upper edge section 80 and lower edge section 82. Belt bracket 68 includes an upper edge surface 92 and a lower edge surface 94 and a second crack initiator 96. Second crack initiator 96 extends between upper edge surface 92 and lower edge surface 94. As will be detailed more fully herein, upper panel 46 is connected to DIW 53 (FIG. 3) through belt bracket 68 through a first dual pin member 99 and a second dual pin member 102. First dual pin member 99 supports a first connecting pin 104 and second dual pin member 102 supports a second connecting pin 106. The term "dual pin member" should be understood to describe one of a pair of pins that connect upper panel 46 to DIW 53 through belt bracket 68.

Figure 7:
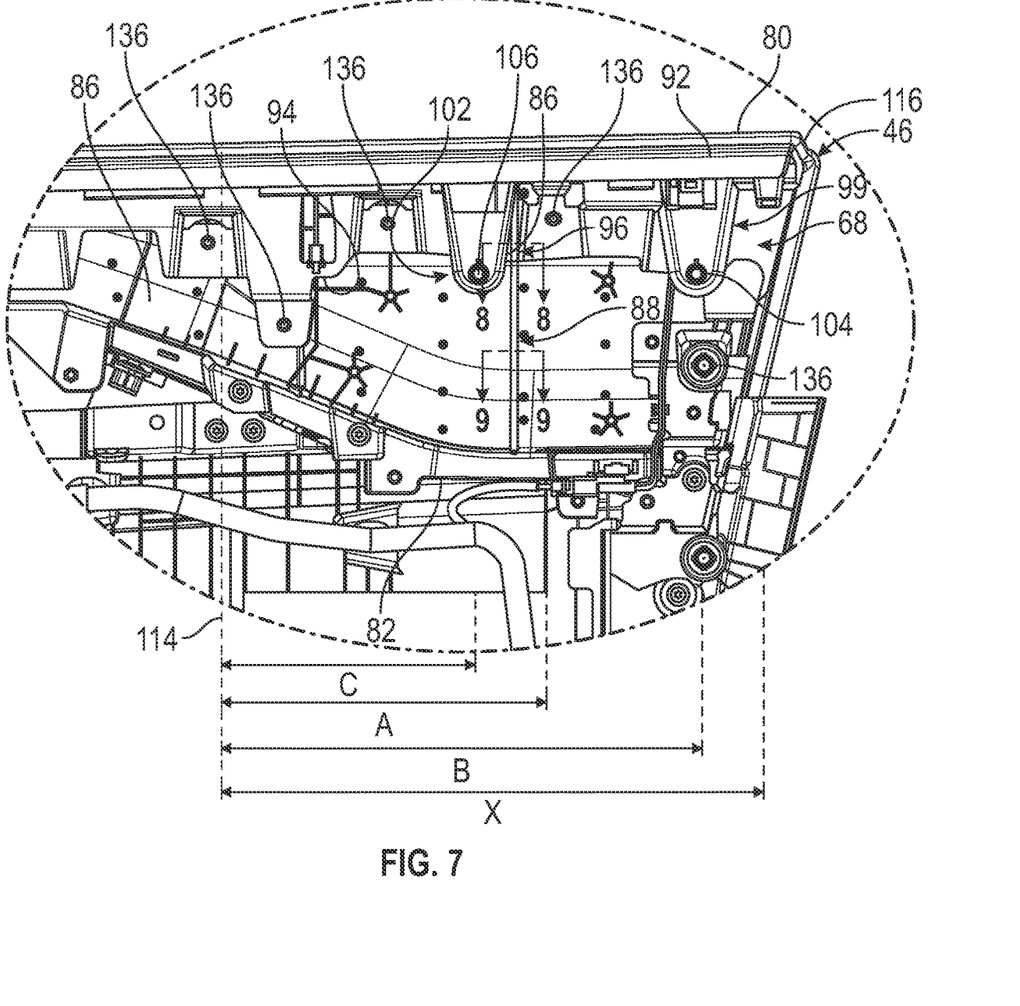
FIG. 7 is a partial plan view of the door of FIG. 6 depicting dual anchor pins and dual crack initiator systems, in accordance with a non-limiting example.
Figure 8:
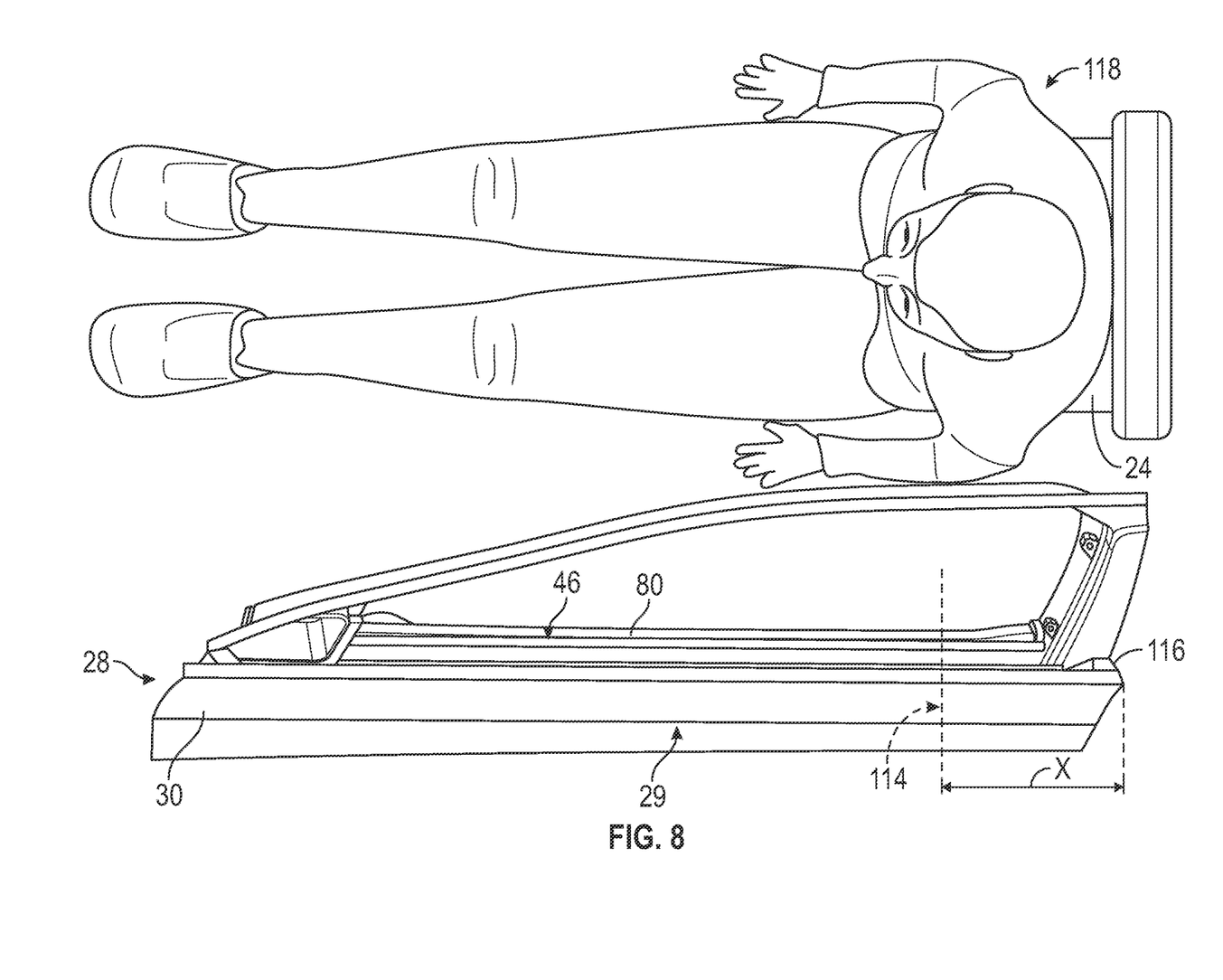
FIG. 8 is top view of a $50^{th}$ percentile male arranged adjacent to the vehicle door, in accordance with a non-limiting example.

In accordance with a non-limiting example, first crack initiator 88 and second crack initiator 96 are positioned between first dual pin member 99 and second dual pin member 102. Further, first crack initiator 88 and second crack initiator 96 are substantially co-linear as shown in FIG. 7. In a non-limiting example, door 28 includes a $50^{th}$ pole touch point 114 spaced a distance "X" from a DIW beltline end 116 as shown in FIG. 7. First crack initiator 88 and second crack initiator 96 are positioned between a $50^{th}$ pole touch point 114 on door 28 and a DIW beltline end 116. As shown in FIG. 8, $50^{th}$ pole touch point 114 is a location on door 28 spaced from DIW beltline end 116 that would be contacted by a $50^{th}$ percentile male during a side impact collision.

In the non-limiting example, shown, first crack initiator 88 and second crack initiator 96 are spaced a distance "A" that is located between about 30% and 35% of distance "X" from $50^{th}$ pole touch point 114. First dual pin member 99 is Spaced a distance "B" that is located a point that is about 80% of the distance "X" from $50^{th}$ pole touch point 114, and second dual pin member 102 is spaced a distance "C" that is located at a point that about 20% and 30% of the distance 'X" from $50^{th}$ pole touch point 114.

Figure 9:
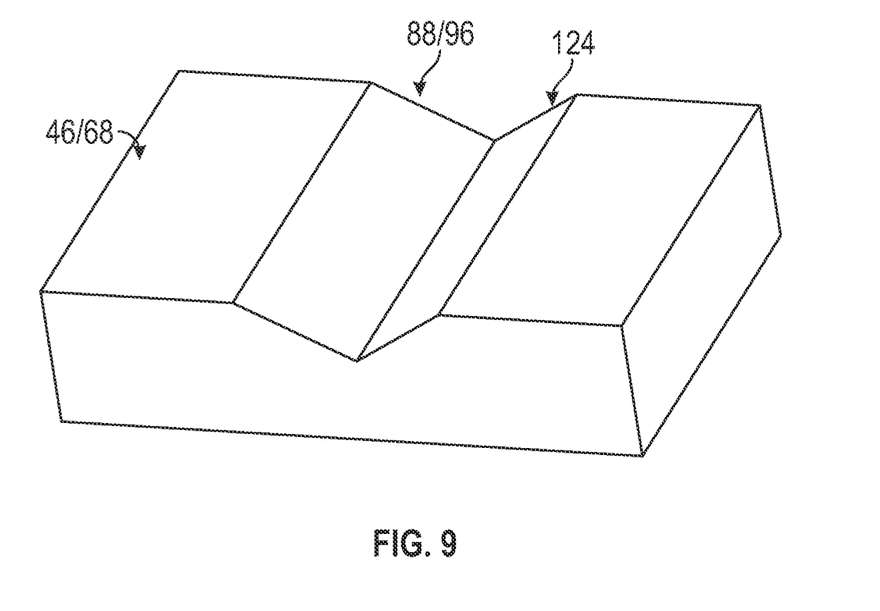
FIG. 9 is a cross-sectional view of each crack initiator system taken through the lines 7-7 in FIG. 6, in accordance with a non-limiting example.

In accordance with a non-limiting example shown in FIG. 9, each of first crack initiator 88 and second crack initiator 96 includes a V-shaped cross-section 124. Of course, it should be understood that first crack initiator 88 and second crack initiator 96 could possess various other geometries. First crack initiator 88 includes a first geometry, and second crack initiator 96 includes a second geometry that is distinct from the first geometry. That is, while each of the first and second crack initiators 88 and 96 includes a substantially V-shaped cross-section 124 formed by two sides (not separately labeled) joined at a substantially 90° angle, the depth of each "V" is different. First crack initiator 88 has a depth of a bout 1.5-mm and second crack initiator 96 includes a depth of about 1-mm.

In a non-limiting example, inner, inner panel 62 include a first opening 130 (FIG. 3) and a second opening (not shown). First dual pin member 99 engages inner, inner panel 62 though first opening 130 and second dual pin member 102 engages inner, inner panel 62 through the second opening. At this point, a detailed description will follow referencing first dual pin member 99 with an understanding that second dual pin member 102 includes corresponding structure. First connecting pin 104 on first dual pin member 99. First connecting pin 104 projects outwardly from first dual pin member 99 and belt bracket 68 and extends through first opening 130 creating an interference/overlap link between upper panel 46 and inner, inner panel 62 through and supported by belt bracket 68. Additional connecting pins 136 on inner surface 86 such as shown in FIGS. 3, 6, and 7 join upper panel 46 to belt bracket 68

In accordance with non-limiting examples disclosed herein, the location of first and second dual pin members 99 and 102 together with the geometry and location of the first and second crack initiators, ensures that door trim panel 32 remains attached to DIW 53 during a side impact collision. That is, the failure mode created by first and second crack initiators 88 and 96 ensures that first and second dual pin members 99 and 102 maintain a connection with DIW 53 during side impact collisions.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical, and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A vehicle door comprising:
   an inner panel having an upper edge and a lower edge;
   a door trim panel having an upper edge portion and a lower edge portion;
   an upper panel connected to the upper edge portion of the door trim panel, the upper panel including an upper edge section and a lower edge section and a crack initiator extending between the upper edge section and the lower edge section; and
   a belt bracket connecting the upper panel and the inner panel, the belt bracket including a first dual pin member and a second dual pin member spaced from the first dual pin member, the first dual pin member and the second dual pin member connecting the upper panel with the inner panel.

2. The vehicle door according to claim 1, wherein the belt bracket includes an upper edge surface connected to the upper panel and a lower edge surface connected to the inner panel, the belt bracket including another crack initiator that extends between the upper edge surface and the lower edge surface.

3. The vehicle door according to claim 2, wherein the crack initiator and the another crack initiator are substantially co-linear.

4. The vehicle door according to claim 3, wherein the crack initiator and the another crack initiator are arranged between the first dual pin member and the second dual pin member.

5. The vehicle door according to claim 2, wherein the crack initiator includes a depth of about 1.5 mm and a substantially V-shaped cross-section including a substantially 90° angle and the another crack initiator includes a depth of about 1 mm and another V-shaped cross-section including a substantially 90° angle.

6. The vehicle door according to claim 2, wherein the vehicle door includes a $50^{th}$ pole touch point spaced from a door in white (DIW) beltline end a first distance, the first dual pin member is arranged between about 20% and about 30% of the first distance from the $50^{th}$ pole touch point.

7. The vehicle door according to claim 6, wherein the crack initiator and the another crack initiator is arranged between about 30% and about 35% of the first distance from the $50^{th}$ pole touch point.

8. The vehicle door according to claim 7, wherein the second dual pin member is arranged between about 80% of the first distance from the $50^{th}$ pole touch point.

9. The vehicle door according to claim 2, wherein the crack initiator includes a substantially V-shaped cross-section having a first geometry and the another crack initiator includes another substantially V-shaped cross-section having a second geometry that is distinct from the first geometry.

10. The vehicle door according to claim 1, wherein the inner panel includes an opening, the first dual pin member including a first component extending from the belt bracket through the opening and a second component extending from the upper panel through the first component.

11. A vehicle comprising:
   a body including a passenger compartment and at least one door, the at least one door comprising:
      an inner panel having an upper edge and a lower edge:
      a door trim panel having an upper edge portion and a lower edge portion;
      an upper panel connected to the upper edge portion of the door trim panel, the upper panel including an upper edge section and a lower edge section and a crack initiator extending between the upper edge section and the lower edge section; and
      a belt bracket connecting the upper panel and the inner panel, the belt bracket including a first dual pin member and a second dual pin member spaced from the first dual pin member, the first dual pin member and the second dual pin member connecting the upper panel with the inner panel.

12. The vehicle according to claim 11, wherein the belt bracket includes an upper edge surface connected to the upper panel and a lower edge surface connected to the inner panel, the belt bracket including another crack initiator that extends between the upper edge surface and the lower edge surface.

13. The vehicle according to claim 12, wherein the crack initiator and the another crack initiator are substantially co-linear.

14. The vehicle according to claim 13, wherein the crack initiator and the another crack initiator are arranged between the first dual pin member and the second dual pin member.

15. The vehicle according to claim 12, wherein the crack initiator includes a depth of about 1.5 mm and a substantially V-shaped cross-section including a substantially 90° angle and the another crack initiator includes a depth of about 1 mm and another substantially V-shaped cross-section including a substantially 90° angle.

16. The vehicle according to claim 12, wherein the vehicle door includes a $50^{th}$ pole touch point spaced from a door in white (DIW) beltline end a first distance, the first dual pin member is arranged between about 20% and about 30% of the first distance from the $50^{th}$ pole touch point.

17. The vehicle according to claim 16, wherein the crack initiator and the another crack initiator is arranged between about 30% and about 35% of the first distance from the $50^{th}$ pole touch point.

18. The vehicle according to claim 17, wherein the second dual pin member is arranged between about 80% of the first distance from the $50^{th}$ pole touch point.

19. The vehicle according to claim 12, wherein the crack initiator includes a substantially V-shaped cross-section having a first geometry and the another crack initiator includes another substantially V-shaped cross-section having a second geometry that is distinct from the first geometry.

20. The vehicle according to claim 11, wherein the inner panel includes an opening, the first dual pin member including a first component extending from the belt bracket through the opening and a second component extending from the upper panel through the first component.

* * * * *